April 1, 1969     J. M. HOLLANDER     3,436,043
HANGER FOR AN INVERTED CHANNEL SECTION INSULATING SHEATH
CONTAINING AN ELECTRICAL CONDUCTOR
Filed April 26, 1967

INVENTOR:-

JOHN MICHAEL HOLLANDER

United States Patent Office 3,436,043
Patented Apr. 1, 1969

3,436,043
HANGER FOR AN INVERTED CHANNEL SECTION INSULATING SHEATH CONTAINING AN ELECTRICAL CONDUCTOR
John Michael Hollander, Kenilworth, England, assignor to E.M.S. Electrical Products Limited, Kenilworth, England
Filed Apr. 26, 1967, Ser. No. 633,831
Claims priority, application Great Britain, May 21, 1966, 22,739/66
Int. Cl. F16l 3/00
U.S. Cl. 248—63                                           3 Claims

ABSTRACT OF THE DISCLOSURE

An inverted channel-shaped insulating sheath for an overhead electrical conductor is grippingly supported by a holder formed in two parts which are mutually tilted about a fulcrum by a screw, and one of which has integral suspension means.

---

The invention relates to a hanger for an insulating sheath of the kind which is of inverted channel section in which an electrical conductor is supported for coaction with a travelling contact extending inwardly of the sheath between the channel lips, and is formed exteriorly of the portion interconnecting the channel side walls with oppositely outwardly facing grooves to be engaged by the hanger, and the invention has for its object an improved form of hanger which is preferably formed from plastic mouldings.

According to the invention the hanger is of inverted channel section and is formed from two mating parts each providing a side wall of the channel and having a bead to engage in the adjacent outwardly facing groove of the sheath, one of the mating parts formed with an integral screw for coaction with a nut for anchoring the hanger in position and also formed with a lateral recess which receives the other mating part, and the two mating parts being interconnected by laterally directed screw means for urging their beads into supporting engagement in the grooves of the sheath for supporting the latter.

According to a feature of the invention one of the mating parts is provided with fulcrum means within the recess and on the side of the interconnecting screw means remote from the beads so that on tightening the said screw means the mating parts are tilted towards each other for their beads to engage the sheath grooves grippingly.

In such a case, and according to a further feature, yielding means are positioned between the mating parts for limiting the gripping pressure of the beads in the sheath grooves when the interconnecting screw means is tightened.

Figure 1:
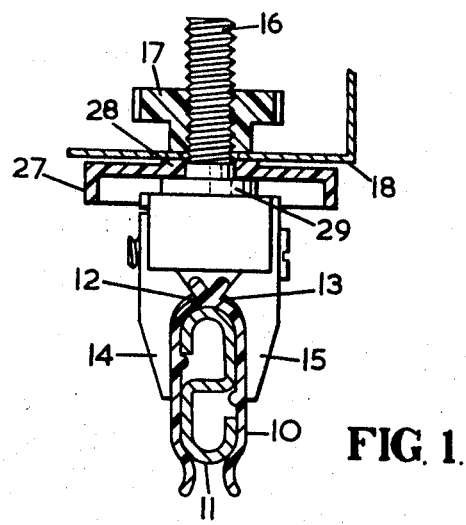
Figure 2:
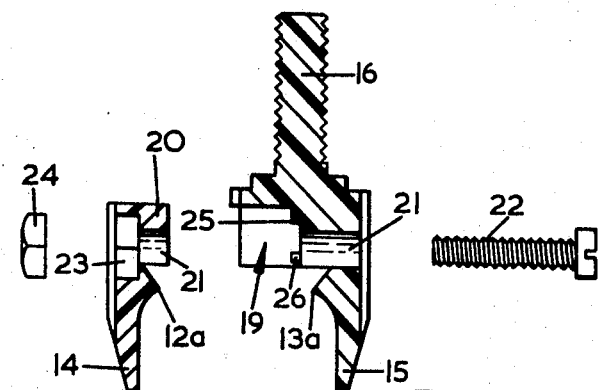
Figure 3:
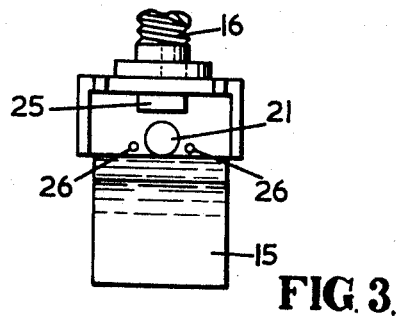

In the accompanying drawings:
FIGURE 1 is a cross-sectional view of one form of hanger in accordance with the invention supporting an insulating sheath;
FIGURE 2 is an exploded sectional view of the hanger of FIGURE 1, and
FIGURE 3 is a view looking into the recess of the said one hanger part.

Referring to FIGURE 1 an inverted channel-section, insulating sheath 10 containing an S-section conductor 11 to be engaged by a travelling contact extending between the channel lips, and having its top provided with outwardly facing grooves 12, 13, is shown supported from a hanger of the invention fromed from plastic.

The hanger is moulded in two parts 14 and 15 each providing a wall of an inverted channel to receive the sheath and formed with respective beads 12a, 13a to engage in the grooves 12 and 13.

The hanger part provided with wall 15 has an integral screw-threaded stem 16 to receive a nut 17 for securing it to a support 18, and it is formed with a recess 19 to receive a rectangular head 20 of the other part. Both parts are formed with aligned bore portions 21 through which a clamping screw 22 extends, and the bore portion in part 14 terminates in a hexagonal depression 23 to hold a nut 24 on screw 22.

Within recess 19, and above bore portion 21, there is a central, integral fulcrum block 25 about which part 14 will be tilted by a tightening of screw 22 to urge beads 12a and 13a firmly into the respective grooves, and at a lower level the inner wall of the recess is provided with two small, laterally-spaced prominences 26 which in becoming crushed by too great a tightening of screw 22 will produce a resistance for protecting the beads and grooves from being subjected to too great a gripping pressure.

An inverted cup 27 for increasing the electrical leak path is shown in FIGURE 1. The cup has a central opening through which the stem 16 extends and it has a boss 28 to abut the bottom of the support 18. Tightening nut 17 causes the cup to be trapped between a boss 29 of the hanger and the support 18.

What I claim as my invention and desire to secure by Letters Patent of the United States is:

1. A hanger for an insulating sheath of inverted channel section in which a hollow electrical conductor formed from sheet metal is supported for coaction with a travelling contact extending inwardly of the sheath between the channel lips and is formed exteriorly of the portion interconnecting the channel side walls with oppositely outwardly-facing grooves to be engaged by the hanger, the conductor occupying the whole of the space within said sheath from said interconnecting portion to said lips, the hanger being of inverted channel section and comprising two mating parts each providing a side wall of the channel, each of said mating parts provided with a bead to engage in the adjacent outwardly facing groove of the sheath, one of said mating parts formed with an integral screw for coaction with a nut for anchoring the hanger in position, said one mating part fromed with a lateral recess to receive the other mating part, and laterally directed screw means interconnecting said mating parts and operable to urge their respective beads into engagement with the respective grooves of said sheath for supporting the latter.

2. A hanger, according to claim 1, in which one of the mating parts is provided with fulcrum means within the lateral recess of the one mating part on the side of the laterally directed interconnecting screw means remote from the beads, so that on tightening the said interconnecting screw means the mating parts are tilted towards each other for their beads to engage the sheath grooves grippingly.

3. A hanger, according to claim 2, comprising yielding means positioned between the mating parts for limiting the gripping pressure of the beads in the sheath grooves when the interconnecting screw means is tightened.

References Cited

UNITED STATES PATENTS

| | | | |
|---|---|---|---|
| 471,096 | 3/1892 | Briggs | 248—63 X |
| 3,091,658 | 5/1963 | Harmon | 174—128 |
| 3,177,542 | 4/1965 | James | 248—63 X |
| 2,824,912 | 2/1958 | Taylor | 191—35 |

FOREIGN PATENTS 749,473  12/1966  Canada.

CHANCELLOR E. HARRIS, *Primary Examiner.*

U.S. Cl. X.R.

174—40; 191—40